United States Patent [19]

Lin et al.

[11] Patent Number: 5,037,050
[45] Date of Patent: Aug. 6, 1991

[54] INTERLOCKING ASSEMBLY FOR ADJUSTABLE MOUNTING OF A DISPLAY UNIT

[75] Inventors: Rong-Jyi Lin, Taipei; James Lo, Taoyuan, both of Taiwan

[73] Assignee: Digital Equipment Corporation, Maynard, Mass.

[21] Appl. No.: 500,486

[22] Filed: Mar. 28, 1990

[51] Int. Cl.⁵ .......................................... A47B 91/00
[52] U.S. Cl. .................................. 248/179; 248/921
[58] Field of Search .............. 248/923, 921, 185, 183, 248/676, 179, 917

[56] References Cited

U.S. PATENT DOCUMENTS 4,591,123  5/1986  Bradshaw ........................ 248/921

OTHER PUBLICATIONS

I.B.M. Technical Disclosure Bulletin vol. 24, No 1A, Jun. 1981, Adjustable Tilt Mechanism for Data-Entry Terminal Lowrie et al. pp. 186–187.

*Primary Examiner*—Robert L. Wolfe
*Attorney, Agent, or Firm*—Arnold, White & Durkee

[57] ABSTRACT

A display mount includes a pair of interlocking portions. An aperture or slot is defined in one portion and a protrusion is formed in the other portion. During assembly, the protrusion is inserted into the aperture or slot. To retain the protrusion in the slot, the protrusion is formed with an enlarged element, and a resilient tab prevents disengagement of the enlarged element from the aperture or slot. The enlarged element, for example, has a ledge defining an underside surface and an outer surface above the underside surface. The resilient tab is disposed adjacent the aperture or slot so that the outer surface of the ledge abuts against the outer surface of the tab to deflect the tab inward during assembly, to release the tab when the enlarged element is moved within the aperture or slot, and to prevent disengagement of the protrusion from the aperture or slot by interference of the underside surface of the ledge with an inner surface of the tab. To further retain the protrusion in the slot, the enlarged element is asymmetrical, and after assembly the angular position of one portion with respect to the other is limited to a predefined range by a pair of protruding stops engaged in respective portions of a figure-eight shaped recess.

31 Claims, 8 Drawing Sheets

INTERLOCKING ASSEMBLY FOR ADJUSTABLE MOUNTING OF A DISPLAY UNIT

BACKGROUND OF THE INVENTION

1. Technical Field

The present invention relates generally to a device for mounting and positioning a display unit, and more particularly to a support permitting a display unit to be tilted and swiveled over a certain angular range to suit a user. Specifically, the present invention relates to such a support that is assembled from two interlocking portions without the use of fasteners.

2. Description of the Related Art

Display units such as video display terminals are in widespread use for microcomputers, data terminals and word processors. Typically the display unit includes a rather heavy cathode ray tube. To suit a particular user or operating environment, it is desirable to mount the display unit in such a way that it can be tilted and swiveled over a certain angular range. This permits the viewing angle of the display to be adjusted for the height and position of the user and to reduce undesired glare or reflections from the display screen.

A common kind of adjustable support employs a "ball and socket" joint in which a hemispherical portion mounted to the underside of the display unit is seated within a mating concave portion mounted on a fixed structure such as a desk or microcomputer cabinet. The hemispherical portion slides and rotates within the concave portion when the display unit is tilted and swiveled. Such a mounting arrangement is especially stable when the center of curvature of the hemispherical portion coincides with the center of gravity of the display unit. In such a case, the hemispherical portion need not be fastened to the concave portion to maintain the selected position of the display unit, because the arrangement is statically stable. Static frictional forces between the hemispherical portion and the concave portion can be sufficient to maintain the selected position against any vibration that is normally present in the work environment. A sufficient amount of static friction is typically guaranteed by texturing the mating surfaces of the hemispherical portion and the concave portion.

Although it is not necessary to fasten the hemispherical portion to the concave portion to make a tilt and swivel mount for a display unit, it is desirable to do so to prevent the concave portion from becoming separated from the hemispherical portion when the display unit is moved or transported. A mechanical connection is also desirable in special applications that may require wires to pass between the hemispherical portion and the concave portion. In any event, the hemispherical portion can be fastened to the concave portion by a "pin and slot" arrangement that still permits the hemispherical portion to slide and rotate over a wide range within the concave portion. In addition, the pin can be hollow to carry wires between the hemispherical portion and the concave portion.

A "pin and slot" connection entails increased costs of fabrication and assembly of the adjustable mount for the display unit. To reduce these costs, the hemispherical and concave portions of the mount have been formed by injection molding which defines the slot and an integral protrusion for making a "pin and slot" connection.

To eliminate the need for a fastener, the integral protrusion has been formed with an enlarged element which normally prevents disengagement of the protrusion from the slot. But the protrusion must engage the slot during the assembly process, and a desire to make inadvertent disassembly unlikely has made assembly more difficult. These conflicting requirements have been addressed in at least two alternative ways.

In a "key and slot" arrangement, the enlarged element formed in the protrusion is asymmetrical and can be easily inserted through only a predefined location of the slot, and only when the protrusion has an abnormal angular relationship with respect to the slot. The abnormal angular relationship results, for example, when the concave portion is rotated 90 degrees from its central position in which a front side of the concave portion is aligned with the display screen. Once the enlarged element has been inserted through the slot, the concave portion is rotated 90° to its central position so that the protrusion becomes locked within the slot. In addition, means are provided for thereafter limiting the angular position of the concave portion to within a certain range about its central position in order to prevent inadvertent disengagement of the protrusion from the slot. The means for limiting the angular position of the concave portion, however, tends to cause interference between the concave portion and the hemispherical portion during assembly.

In an alternative arrangement, the slot is enlarged at one end to permit insertion of the protrusion into the slot at that extreme location. In addition, a resilient stop is mounted near the extreme location to prevent the protrusion from sliding back to the extreme location unless the stop is forced. This arrangement, however, requires that the stop must apply a good deal of force against the protrusion to prevent disengagement of the protrusion from the slot when the end of travel is reached during normal adjustment of the display unit. This in turn complicates the construction of the stop as a unitary part of the hemispherical or concave portion of the mount. In addition, a good deal of force must be applied during assembly to initially engage the protrusion in the slot. To avoid inadvertent breakage during assembly, the protrusion must be carefully aligned with the enlarged portion of the slot before the force is applied.

In contrast to the known alternative arrangements for interlocking a hemispherical portion and a concave portion to form an adjustable display mount, the means for preventing disengagement of the protrusion from the slot should have a low profile and should be capable of being fabricated as a unitary structure by injection molding of the hemispherical or concave portions. Moreover, the protrusion should be easily inserted into the slot during assembly but should be locked into place during normal adjustment of the video display. Furthermore, the interlocking arrangement should not permit inadvertent disassembly to occur when a limit of adjustment is reached.

SUMMARY OF THE INVENTION

Accordingly, the present invention provides a display mount including two interlocking portions. An aperture or slot is formed in one portion, and a protrusion is formed in the other portion. During assembly the protrusion is inserted into the aperture or slot. To retain the protrusion in the aperture or slot, the protrusion is formed with an enlarged element.

In accordance with a first aspect of the invention, a resilient tab prevents disengagement of the enlarged element but does not interfere with rotation or travel of the protrusion within the aperture or slot. The enlarged element, for example, has a ledge defining an underside surface beneath the ledge and an outer surface above the ledge. The resilient tab is disposed adjacent the aperture or slot so that the outer surface of the ledge abuts against an outer surface of the tab to deflect the tab inward during assembly by insertion of the protrusion into the aperture or slot. The tab is released when the enlarged element is moved away from the tab without removal of the protrusion from the aperture or slot, and disengagement of the protrusion from the aperture or slot is prevented by interference of the underside surface of the ledge with an inner surface of the tab when the enlarged element is moved back near the tab. Therefore the resilient tab may prevent disengagement of the protrusion from the aperture or slot without interfering with movement of the protrusion within the aperture or slot. Moreover, the resilient tab may define a portion of the aperture so that the resilient tab may have a very low profile.

Preferably the aperture is in the form of a slot having an intermediate location where insertion or retraction of the protrusion is permitted. A resilient tab is disposed adjacent the intermediate location to prevent retraction of the protrusion from the slot at the intermediate location without interfering with travel of the protrusion along the slot or rotation of the protrusion within the slot.

In accordance with a second aspect of the invention, the enlarged element on the protrusion is asymmetrical to lock the protrusion within the aperture or slot when the protrusion is rotated away from the resilient tab. In this case the interlocking portions of the mount can be positively locked together when the display unit is adjusted at any normal viewing angle. To further reduce the possibility of inadvertent disassembly, the display unit is locked within a range of swiveling by a pair of protruding stops that are received in respective portions of a figure-eight shaped recess. In addition, during assembly, one of the stops is received in a guide that prohibits rotation until the protrusion is slid along the slot sufficiently to release the resilient tab. This facilitates assembly without promoting disassembly.

The preferred mount is easily assembled by aligning the enlarged element of the protrusion with the slot, inserting the protrusion into the slot, sliding the protrusion along the slot, and then rotating the interlocking portions of the mount with respect to each other, to thereby lock the portions together. A worker on an assembly line can rapidly perform the alignment, insertion, sliding and rotation operations with minimal care and effort.

BRIEF DESCRIPTION OF THE DRAWINGS

Other objects and advantages of the invention will become apparent upon reading the following detailed description and upon reference to the drawings in which.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Figure 1:
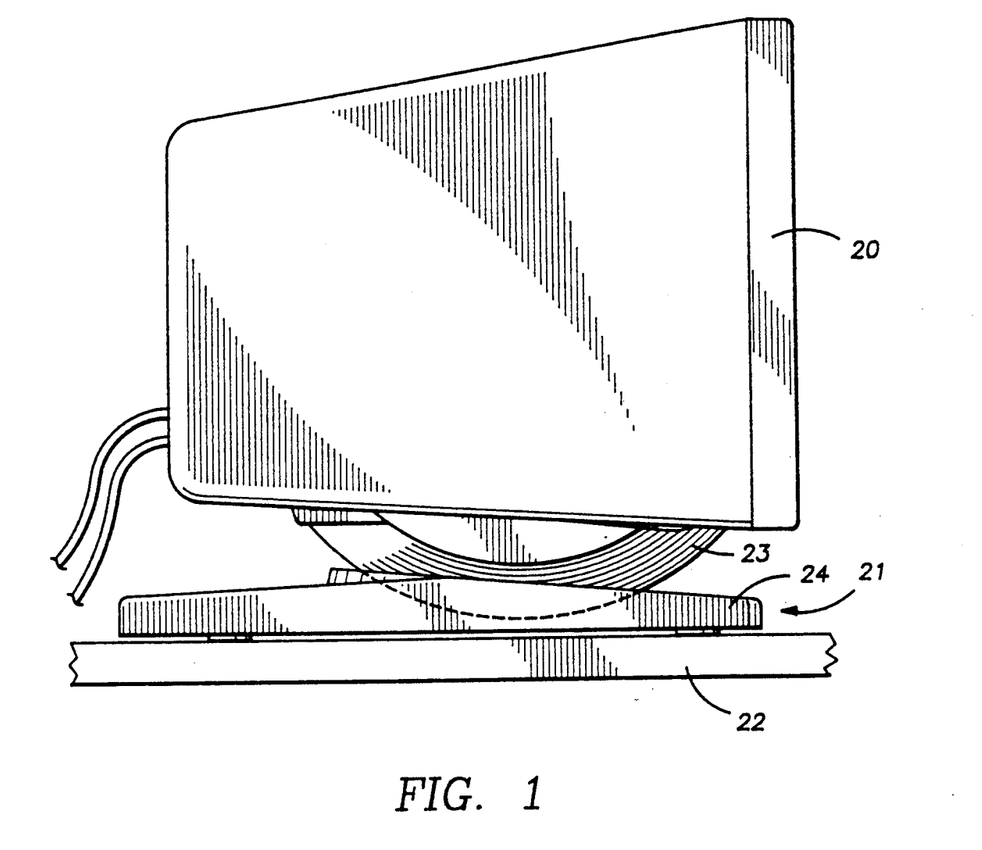
FIG 1 is a side view of a display unit being adjustably mounted to a table by an interlocking assembly according to the present invention.
Figure 2:
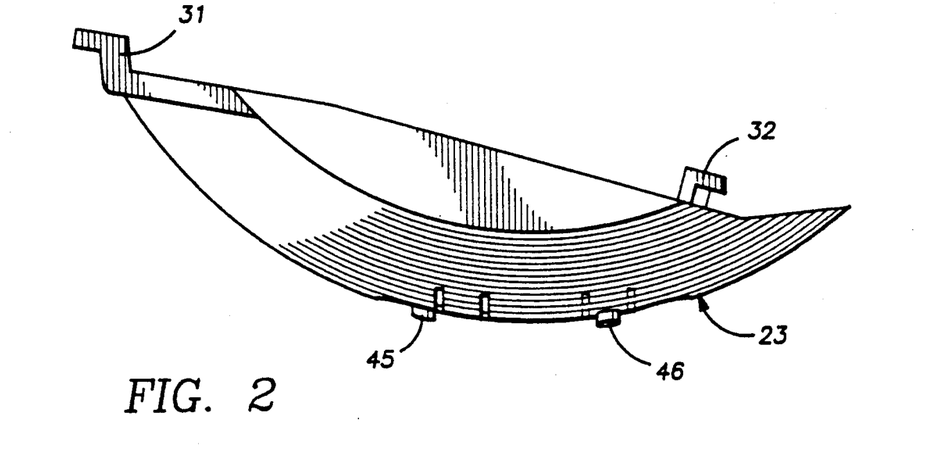
FIG. 2 is a side view of a hemispherical portion of the mounting assembly of FIG. 1.

Turning now to FIG. 1, there is shown a display unit such as a video display terminal 20 adjustably mounted via an interlocking assembly 21 to a fixed structure 22 such as a table top. To permit the display unit 20 to be tilted and swiveled for adjusting the viewing angle, the interlocking assembly 21 includes a hemispherical portion 23 that is seated in a concave portion 24 to form a ball-and-socket joint. In particular, the hemispherical portion 23 is mounted to the underside of the display unit 20, and the concave portion 24 is mounted on the fixed structure 22. In the illustrated embodiment, the display unit 20 rests on the surface of a table top. Such an arrangement is particularly stable when the center of curvature of the hemispherical portion 23 coincides with the center of gravity of the display unit 20. In this case, the hemispherical portion 23 and the mating surface on the concave portion 24 can be suitably textured to provide sufficient static friction for holding the selected viewing angle against any vibration that is normally present in the work environment.

The present invention is more particularly directed to a means for interlocking the hemispherical portion 23 to the concave portion 24 so as to prevent these two portions of the mounting assembly from becoming separated when the display unit 20 is moved or transported. The interlocking means are not visible in FIG. 1 because they are concealed within the hemispherical portion 23 or covered by the mating of the hemispherical portion 23 within the concave portion 24.

Various views of the hemispherical portion 23 are shown in FIGS. 2 to 5. The top of the hemispherical portion is provided with four feet 31, 32, 33 and 34 which snap into the bottom of the display unit (20 in FIG. 1). For strength and rigidity, the inside of the hemispherical portion includes a number of reinforcing ribs such as ribs 35 and 36 which all extend vertically upward in the side view of FIG. 5. This arrangement permits the ribs to be integrally molded into the hemispherical portion 23 in an injection molding process. Both the hemispherical portion 23 and the concave portion (24 in FIG. 1) of the interlocking assembly, for example, are made of a thermoplastic resin such as polyphenylene oxide which is sold, for example, by the General Electric Company as Type PX4400 resin. The entire housing of the display unit 20 is preferably made of the same resin.

Figure 3:
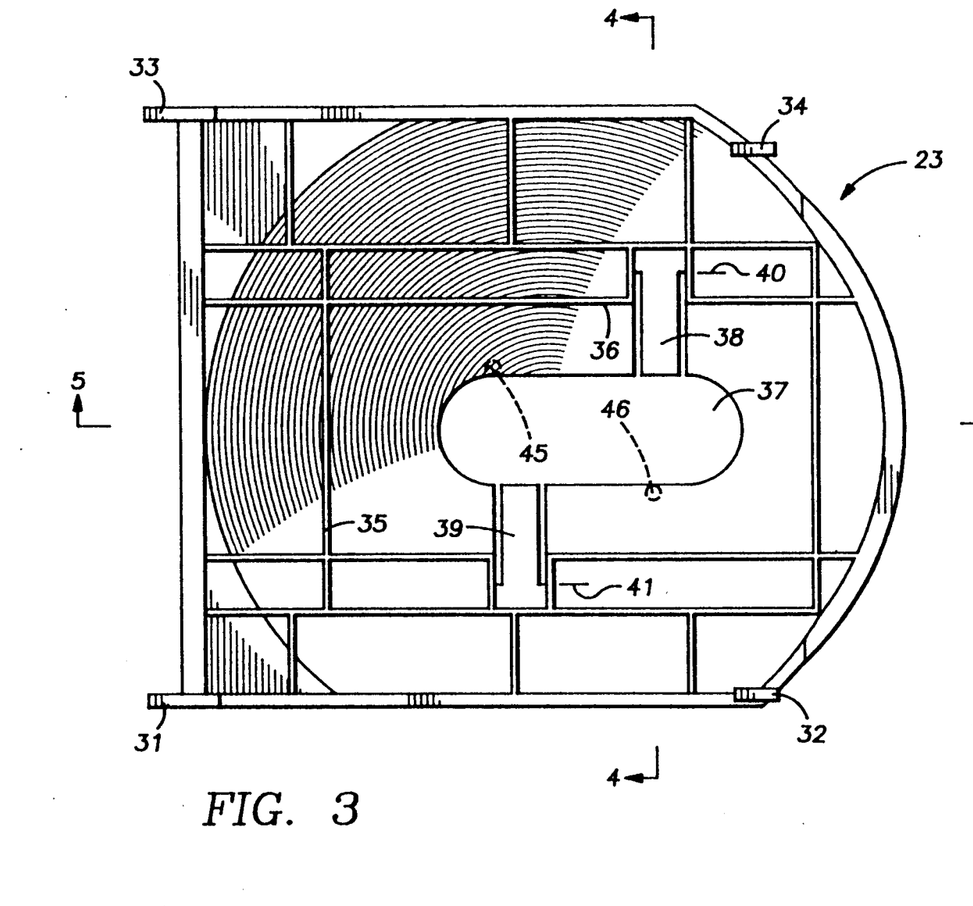
FIG. 3 is a top view of the hemispherical portion of FIG. 2.
Figure 4:
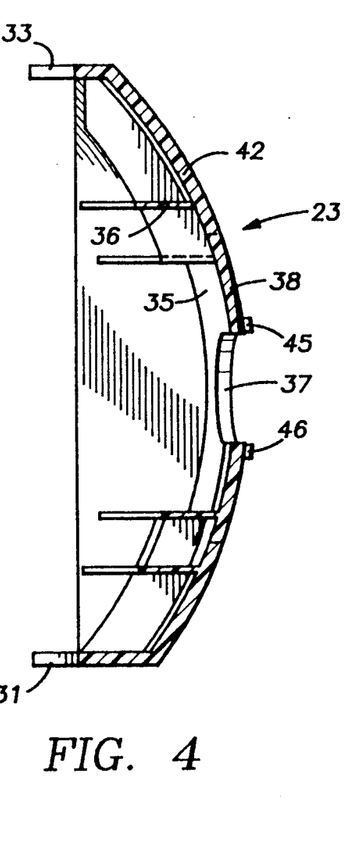
FIG. 4 is a front sectional view of the hemispherical portion along line 4—4 of FIG. 3.

In accordance with an important aspect of the present invention, the hemispherical portion 23 includes half of a "pin-and-slot" connection with the concave portion (24 in FIG. 1). Preferably the hemispherical portion has defined therein a slot 37 for the pin-and-slot connection. As shown in FIG. 3, the slot 37 has rounded end portions matching a rounded protrusion (55 in FIG. 10) which functions as the pin and is part of the concave portion (24 in FIG. 1). The slot 37 is associated with at least one resilient tab that prevents removal of the protrusion from the slot, as will be further described below in connection with FIGS. 16 to 19

As shown in FIG. 3, there are preferably two resilient tabs 38 and 39 associated with the slot 37. Each of these resilient tabs 38, 39 defines respective edge portions of the slot 37. Moreover, the tabs 38 and 39 are diametrically opposite each other on opposite sides of the slot 37, and are displaced from each other along the length of the slot. The tabs 38, 39 are generally planar and conform to and are in alignment with the spherical shape of the hemispherical portion 23. The tab 38 extends from the ribbed structure of the hemispherical portion beginning at a point 40 and extending to the slot 37, and in a similar fashion the tab 39 begins at a point 41 and extends to the slot.

Figures 5, 6, 7:
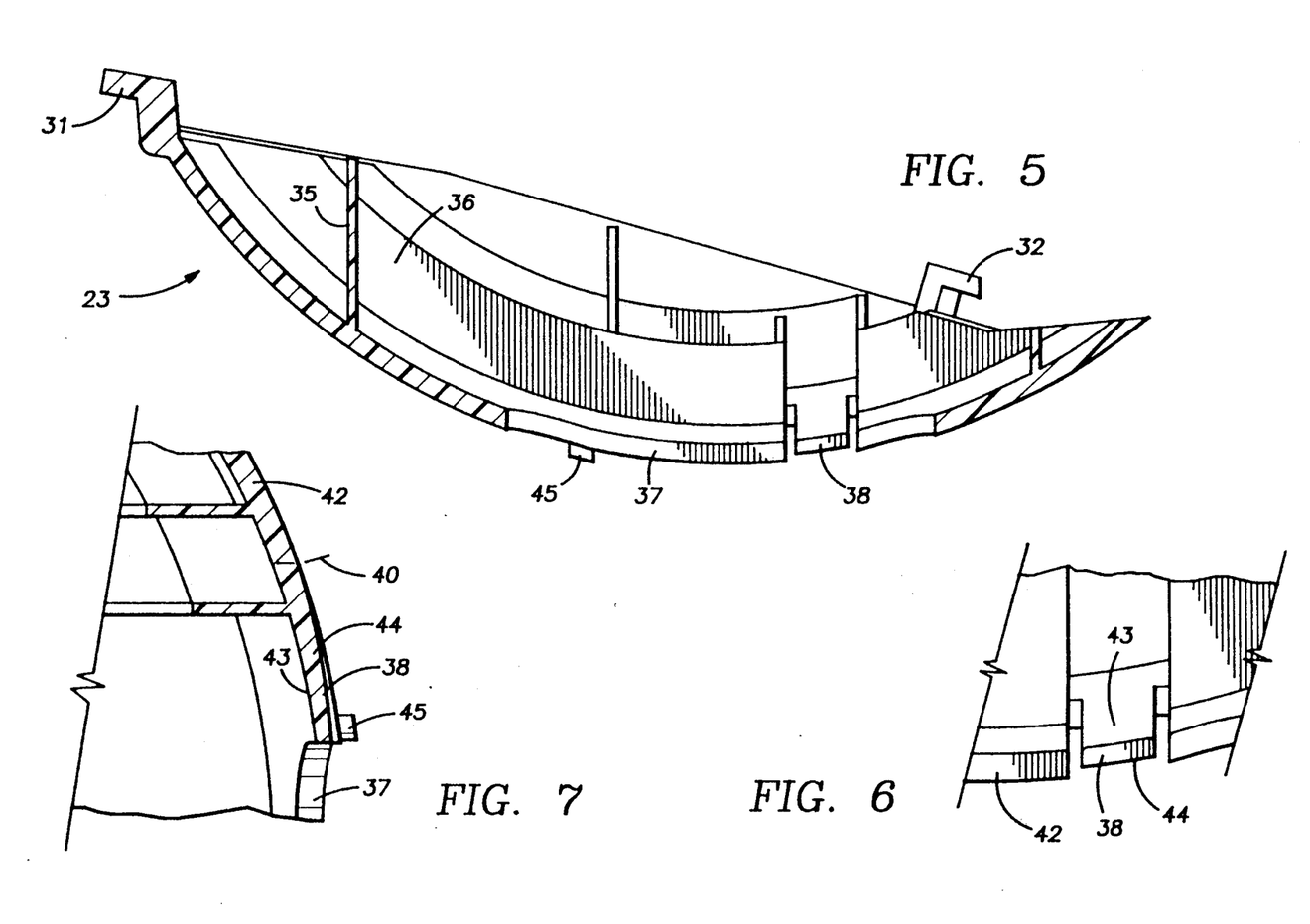
FIG. 5 is a side sectional view of the hemispherical portion along line 5—5 in FIG. 3.
FIG. 6 is an expanded end view of one of the resilient tabs formed in the hemispherical portion as previously shown in FIG. 3.
FIG. 7 is an expanded view of the resilient tab in section along line 4—4 of FIG. 3.
Figure 8:
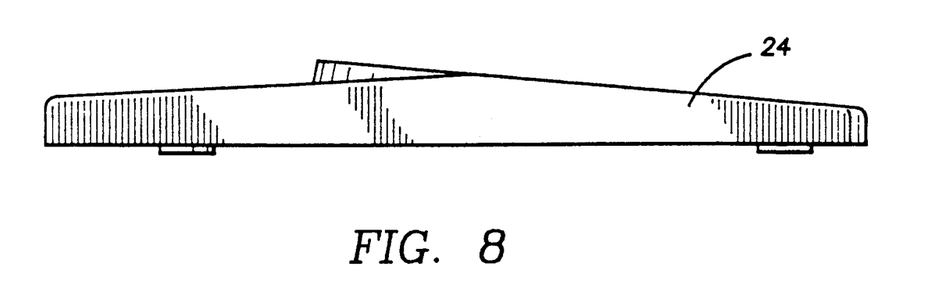
FIG. 8 is a side view of a concave portion of the interlocking assembly of FIG. 1.

As shown in FIG. 6, the tab 38 is separated from the hemispherical wall 42 of the hemispherical portion 23. The tab has an inside surface 43 having rounded corners, and an outside surface 44 that is tapered. As further shown in FIG. 7, the resilient tab 38 is tapered along its length. The rounded corners and tapering of the tab insure that the tab will not interfere with the sliding and tilting of the hemispherical portion 23 when it is mated with the concave portion (24 in FIG. 1).

Preferably the interlocking assembly (21 in FIG. 1) includes means for restricting the swiveling of the video display 20 to within a normal range of viewing angle. The preferred range is 120 degrees total, or plus-and-minus 60 degrees from the normal central position of the video display which is shown in FIG. 1. The preferred means for restricting the swiveling of the display unit includes a pair of diametrically disposed protruding stops 45 and 46 formed in the hemispherical portion 23. The stops 45, 46 are received in respective portions (47 and 48 in FIG. 10) of a figure-eight shaped recess in the concave portion (24 in FIG. 10).

Figure 9:
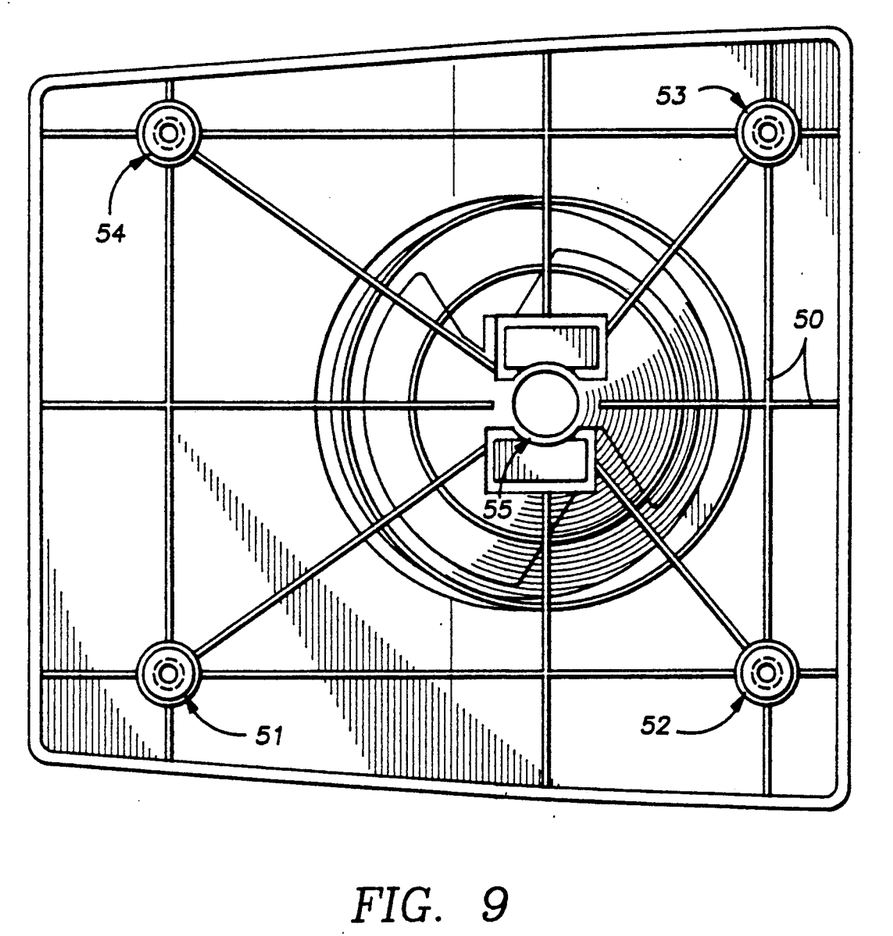
FIG. 9 is a bottom view of the concave portion of FIG. 8.

Turning now to FIGS. 8 to 12, there are shown various views of the concave portion 24 of the interlocking assembly (21 in FIG. 1). The bottom view in FIG. 9 illustrates that a number of reinforcing ribs 50 are molded into the concave portion. Some of these reinforcing ribs extend from support areas 51, 52, 53 and 54 for respective rubber feet (not shown). Some of these reinforcing ribs also terminate near the base of the protrusion 55 which is protruding downward in FIG. 9.

Figure 10:
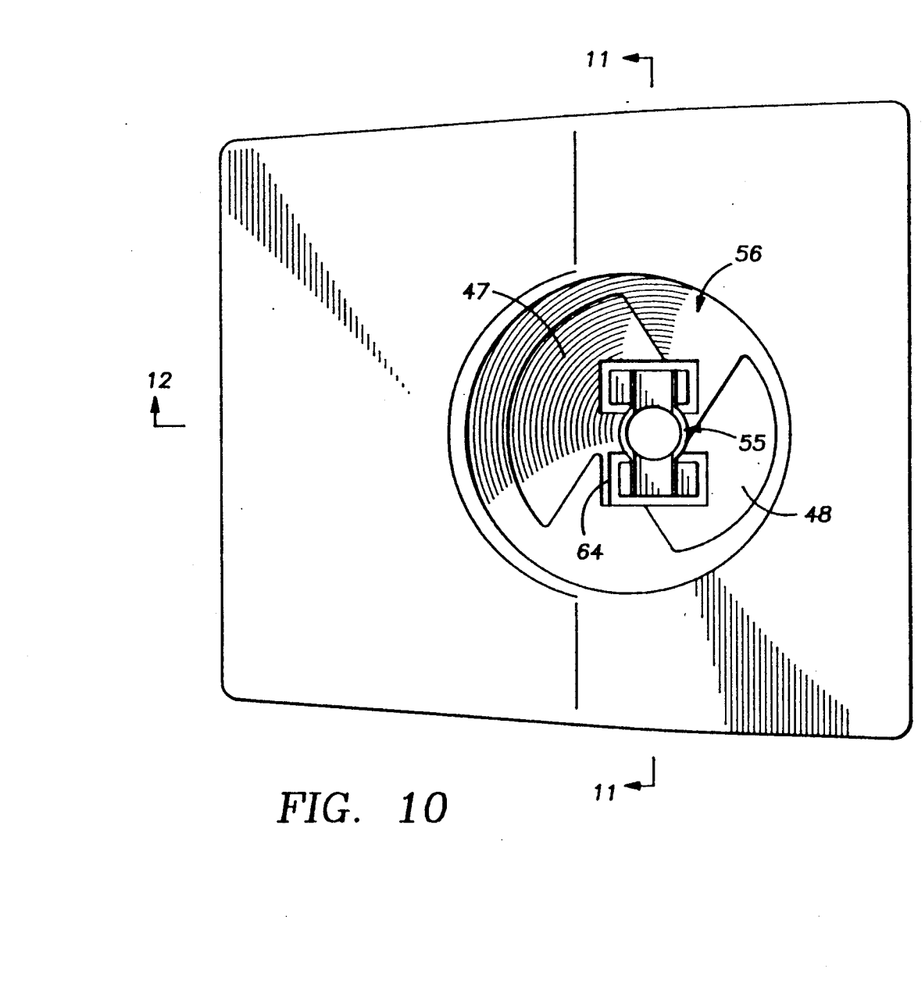
FIG. 10 is a top view of the concave portion of FIG. 8.
Figure 11:
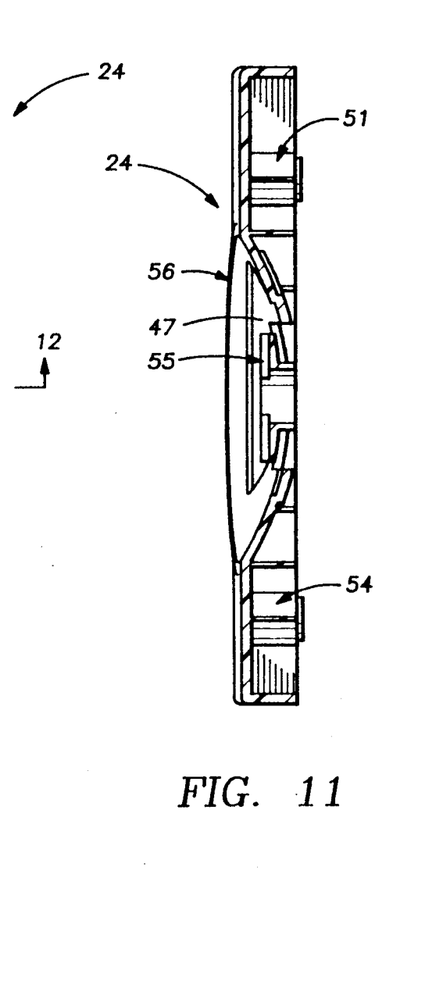
FIG. 11 is a front sectional view of the concave portion along line 11—11 of FIG. 10.
Figure 12:
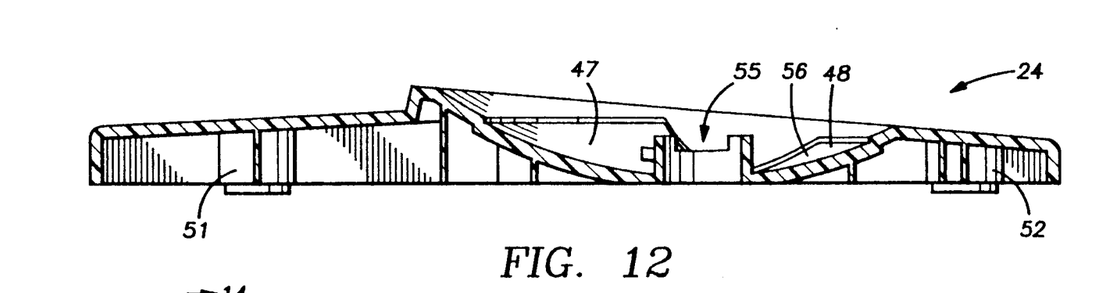
FIG. 12 is a side sectional view of the concave portion along line 12—12 of FIG. 10.

Shown in FIG. 10 is a top view of the concave portion 24. The concave portion includes a concave seat generally designated 56 which is contoured to receive the outer hemispherical surface of the hemispherical portion (23 in FIG. 1). Formed in the concave portion 56 is a figure-eight shaped recess having the respective portions 47 and 48 which receive the protruding stops (45 and 46 in FIGS. 2 to 4) which protrude from the hemispherical portion (23 in FIGS. 2 to 4). Preferably the recessed portions 47 and 48 are recessed by 0.080 inches (2.0 mm), which is smaller than the preferred wall thickness of 0.125 inches (3.2 mm) of the concave seat 56.

Figure 13:
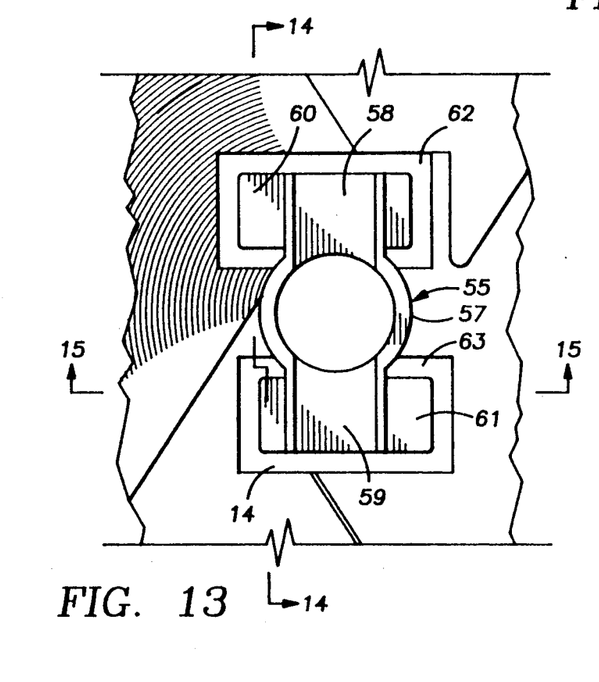
FIG. 13 is an expanded view of a protrusion formed in the hemispherical portion as previously shown in FIG. 10.
Figures 14, 15:
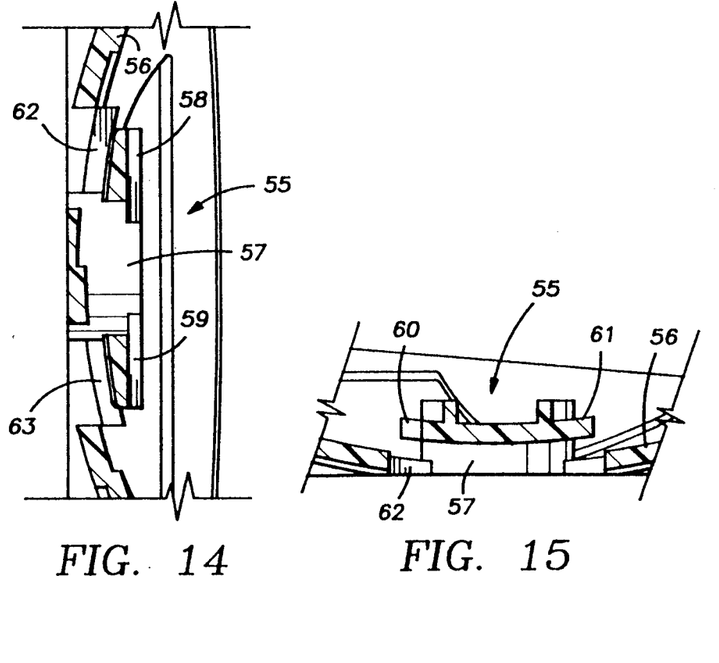
FIG. 14 is a rear sectional view of the protrusion along line 14—14 of FIG. 13.
FIG. 15 is a side sectional view of the protrusion along line 15—15 of FIG. 13.

Turning now to FIGS. 13 to 15, the protrusion 55 is shown in greater detail. The protrusion includes a cylindrical stem 57 protruding from the contoured seat 56 of the concave portion. To lock the protrusion within the slot (37 in FIG. 3) of the hemispherical portion, the protrusion 55 further includes enlarged elements 58 and 59 in the top portion of the protrusion. The enlarged elements 58, 59 are spaced from the contoured surface 56 by a gap that is slightly greater than the thickness of the hemispherical wall (42 in FIG. 4) of the hemispherical portion. In addition, the enlarged elements 58 and 59 include respective rigid tabs 60 and 61 having outer surfaces that abut against the outer surfaces of the resilient tabs (38 and 39 in FIG. 3) during assembly of the interlocking mount (21 in FIG. 1). The rigid tabs 60, 61 are respective ledges having underside surfaces which interfere with the inner surfaces of the resilient tabs (38 and 39 in FIG. 3) once the protrusion 55 is locked into the slot (37 in FIG. 3).

In order to form the enlarged elements 58 and 59 by an injection molding process, the concave seat (55 in FIG. 10) is formed with respective apertures 62, 63 below the enlarged elements 58 and 59. To prevent binding at the corners of the apertures, the corners are chamfered at about 30 degrees. The chamfers are depicted by the phantom lines about the apertures in FIG. 13.

Figure 16:
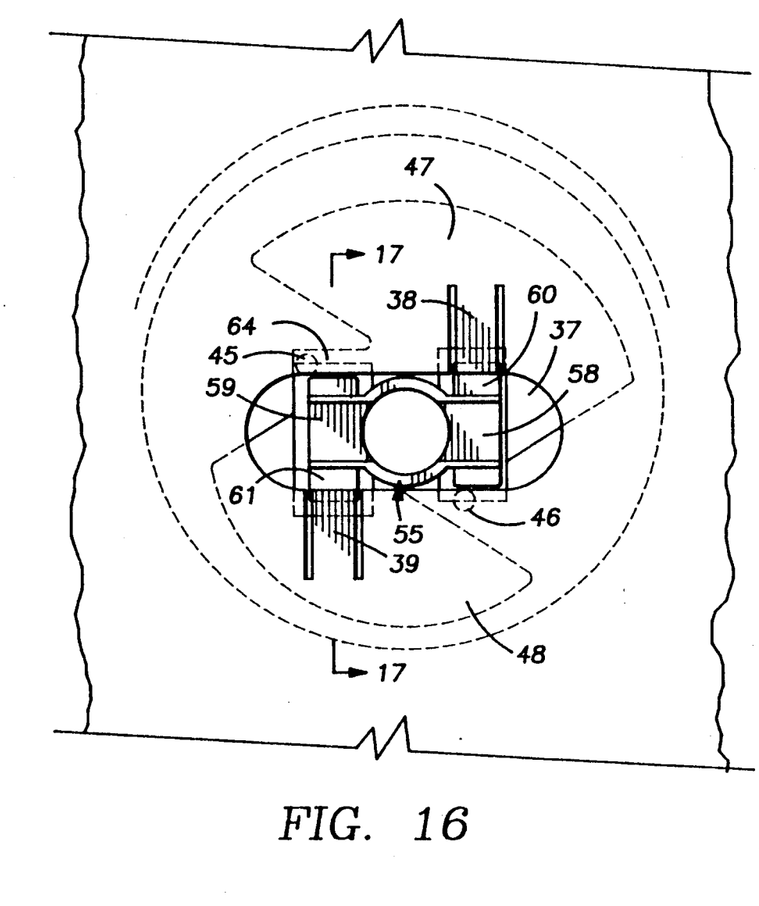
FIG. 16 is a top view showing the hemispherical portion of the interlocking assembly of FIG. 1 being assembled onto the concave portion of the assembly by aligning the protrusion with a slot in the hemispherical portion.

The method of assembly is illustrated by FIGS. 16 to 19. In FIG. 16, the protrusion 55 is aligned with the slot 37 so that the outer surfaces of the rigid tabs 60 and 61 on the protrusion 57 abut against the outer surfaces of the resilient tabs 38 and 39, and so that the protruding stop 45 is aligned with a guide portion 64 of the recessed portion 47. To achieve this alignment, the concave portion 23 is rotated 90° to the right from the center of its normal orientation with respect to the hemispherical portion. Then, the hemispherical portion 23 is seated upon the contoured surface 56 of the concave portion 24.

Figure 17:
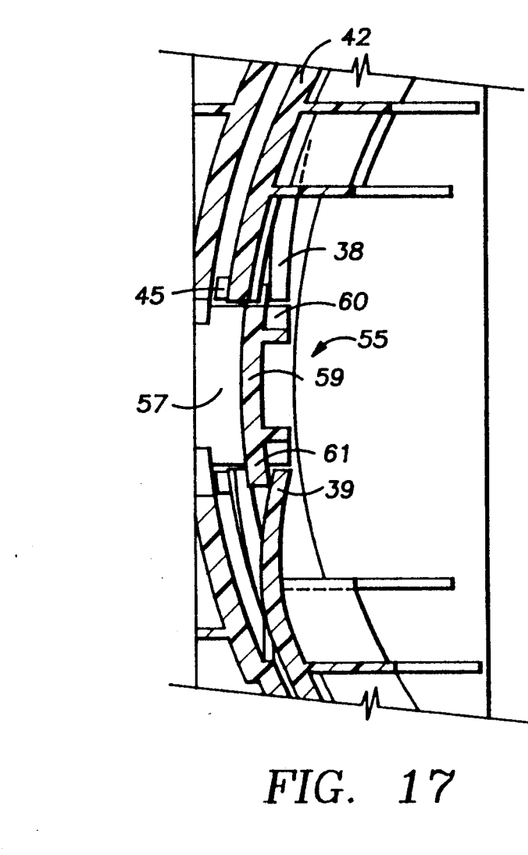
FIG. 17 is a rear sectional view of the slot and protrusion in FIG. 16 along line 17—17.
Figure 18:
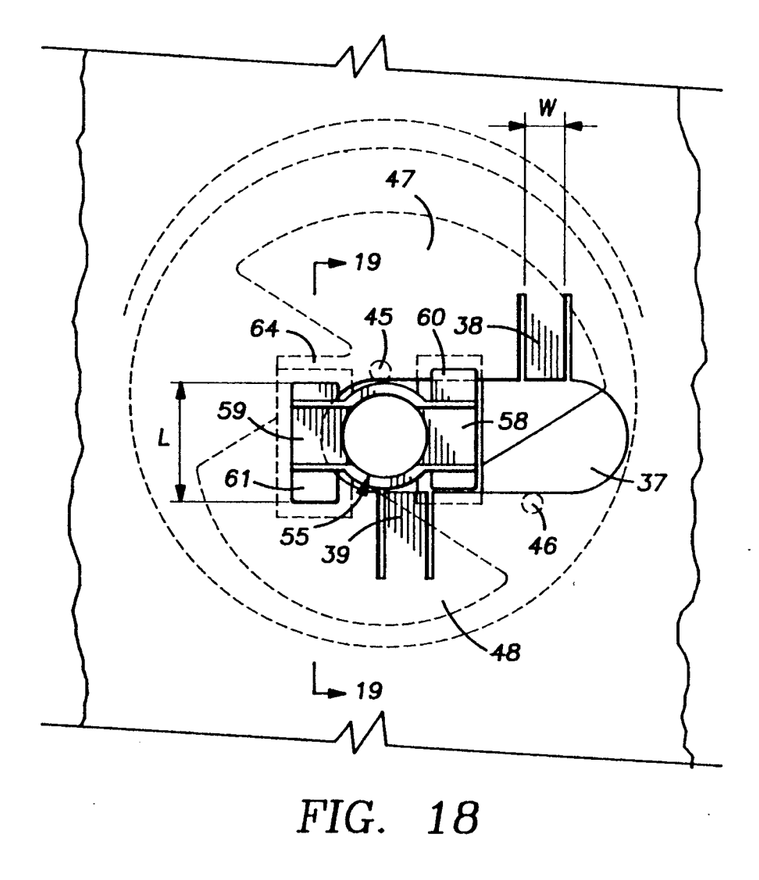
FIG. 18 shows the assembly of FIG. 16 after the protrusion is slid along the slot by tilting the hemispherical portion with respect to the concave portion.
Figure 19:
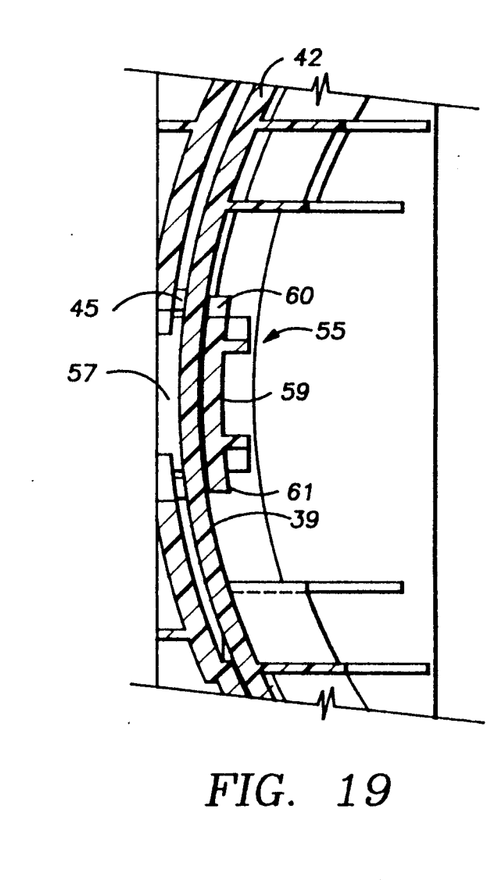
FIG. 19 is a rear sectional view of the protrusion and slot along line 19—19 of FIG. 18.

Next, as illustrated in FIG. 17, the hemispherical portion is forced toward the concave portion to deflect the resilient tabs 38 and 39. Then, as shown in FIG. 18, the concave portion is slid with respect to the hemispherical portion along the direction of the slot 37 to slide the protrusion 55 with respect to the slot 37. This sliding causes the rigid tabs 60 and 61 to release the resilient tabs 38 and 39. In addition, the enlarged elements 58 and 59 engage the inside surface of the hemispherical wall 42 of the hemispherical portion to lock the protrusion 55 in the slot 37 so long as the protrusion is not oriented precisely in alignment with the resilient tabs. Such a precise alignment is abnormal, and even if it were to occur, disengagement of the protrusion 55 from the slot 37 would be prevented by interference of the underside surfaces of the rigid tabs 60, 61 with the inside surfaces of the resilient tabs 38, 39.

The final step in the assembly procedure is to rotate the hemispherical portion to its central position. As shown in FIG. 18, the enlarged elements 58 and 59 have a length (1) exceeding the width (w) of the resilient tabs 38 and 39. Therefore, when the hemispherical portion is rotated so that it is in its central orientation with respect to the concave portion, the enlarged elements 58 and 59 easily slide over the resilient tabs 38 and 39 and are always supported by the hemispherical wall 42 of the hemispherical portion. This further insures that the resilient tabs do not interfere with the normal tilting and swiveling of the display unit as the protrusion 55 slides and rotates within the slot 37.

During the final step of the assembly procedure, the rotation causes the protruding stop 46 to travel in the direction of the arrow 65 and become entrained within the recessed portion 48. This prevents the protrusion 55 from becoming aligned with the slot 37 in such a way to permit disassembly, and limits the swiveling of the display to plus-and-minus 60 degrees from its normal central position. The protrusion 55 rotates within the slot 37 and the protruding stops 45, 46 travel within their respective recesses 47, 48 when the user (not shown) swivels the display unit between right and left positions, and the protrusion slides up and down the length of the slot when the user tilts the display unit between forward and backward positions.

In view of the above, there has been described a display mount including interlocking portions having formed therein an aperture or slot and a protrusion for insertion into the aperture or slot. To retain the protrusion in the slot, the protrusion is formed with an enlarged element and the interlocking portion having the aperture or slot is formed with a resilient tab that prevents disengagement of the enlarged element but does not restrict rotation or travel of the protrusion within the slot. Rotation, however, is restricted to within a preselected range by a pair of stops protruding into respective recesses. The protrusion, the resilient tab, the protruding stops, and the recesses have low profiles and are easily formed by injection molding. The protrusion is easily inserted into the slot during assembly but is locked into place during normal adjustment of the display. The interlocking arrangement prevents inadvertent disassembly from occurring when a limit of adjustment is reached. Moreover, a worker on an assembly line can rapidly perform the alignment, insertion, sliding and rotation operations with minimal care and effort.

We claim:

1. An interlocking assembly for adjustably mounting a display unit with respect to a fixed structure; said assembly including a first portion and a second portion, one of said first and second portions being adapted for mounting to said display unit and the other of said first and second portions being adapted for mounting to said fixed structure; said first portion having defined therein an aperture; said second portion having defined thereon a protrusion adapted for protruding through said aperture; said protrusion having an enlarged element for preventing disengagement of said protrusion from the aperture; said enlarged element defining a ledge having an underside surface under the ledge and an outer surface above the ledge; said first portion having a resilient tab, said tab having inner and outer surfaces with respect to said second portion, and said tab being disposed adjacent to said aperture so that the outer surface of said ledge abuts against the outer surface of said tab to deflect said tab inward during assembly by insertion of said protrusion into said aperture, the deflected tab being released when said enlarged element is moved away from said tab by movement of said first portion with respect to said second portion without removal of said protrusion from said aperture, and thereafter preventing disengagement of said protrusion from said aperture by interference of the underside surface of said ledge with the inner surface of said tab when said enlarged element is moved back near said tab.

2. The interlocking assembly as claimed in claim 1, wherein said enlarged element is asymmetrical so that said protrusion is locked within said aperture when the first portion is rotated with respect to the second portion.

3. The interlocking assembly as claimed in claim 2, further comprising means for limiting the angular position of the first portion with respect to the second portion to within a predefined angular range after the enlarged element is moved away from said tab by rotating the first portion with respect to the second portion.

4. The interlocking assembly as claimed in claim 3, wherein said means for limiting includes a pair of protruding stops and means for defining respective portions of a figure-eight shaped recess for receiving said stops.

5. The interlocking assembly as claimed in claim 1, wherein said aperture is in the form of a slot, and said enlarged element is proportioned so that said tab is released when the enlarged element is moved away from said tab by sliding said first portion with respect to said second portion.

6. The interlocking assembly as claimed in claim 5, further comprising means for guiding said sliding of said first portion with respect to said second portion along said slot and preventing rotation of said first portion with respect to said second portion until said tab is released.

7. The interlocking assembly as claimed in claim 1, wherein the resilient tab defines an edge portion of said aperture interfering with the disengagement of said protrusion from the aperture.

8. The interlocking assembly as claimed in claim 1, wherein the inner surface of said tab which interferes with the enlarged element is parallel to said outer surface of said tab.

9. The interlocking assembly as claimed in claim 1, wherein said enlarged element includes a rigid tab which defines the ledge.

10. The interlocking assembly as claimed in claim 1, wherein the first and second portions are unitary pieces of thermoplastic resin.

11. An interlocking assembly for adjustably mounting a display unit with respect to a fixed structure; said assembly including a first portion and a second portion, one of said first and second portions being adapted for mounting to said display unit and the other of said first and second portions being adapted for mounting to said fixed structure; said first portion having defined therein a slot; said second portion having defined thereon a protrusion adapted for protruding through said slot; said protrusion having an enlarged element for preventing disengagement of said protrusion from the slot; said slot having opposite end portions and an intermediate location into which insertion of the enlarged element is permitted; and one of said portions having a resilient tab for preventing retraction of the enlarged element from the slot at the intermediate location without interfering with travel of the protrusion along the slot or rotation of the protrusion within the slot.

12. The interlocking assembly as claimed in claim 11, wherein said enlarged element is asymmetrical and proportioned to lock said protrusion within said slot when the protrusion is rotated after insertion into said slot at the intermediate location.

13. The interlocking assembly as claimed in claim 12, further comprising a pair of protruding stops and respective portions of a figure-eight shaped recess for receiving said stops for limiting the angular position of the first portion with respect to the second portion to within a predefined angular range after the protrusion is inserted into said slot at the intermediate location and rotated.

14. An interlocking assembly for adjustably mounting a display unit on a fixed structure; said assembly including a hemispherical portion being adapted for mounting to the underside of said display unit, and a concave portion mating with said hemispherical portion and being adapted for mounting on said fixed structure; one of said hemispherical portion and said concave portion having defined therein a slot; and the other of said portions having defined thereon a protrusion adapted for protruding through said slot; said protrusion having an enlarged element for preventing disengagement of said protrusion from the slot; said one of said hemispherical portion and said concave portion having a resilient tab defining an edge portion of said slot interfering with the disengagement of said protrusion from the slot; and said tab having inner and outer surfaces with respect to said second portion that extend from said edge portion of the slot; said enlarged element defining a ledge having an underside surface under the ledge and an outer surface above the ledge; said enlarged element being proportioned so that the outer surface of said enlarged element abuts against the outer surface of said tab to deflect said tab inward during assembly by insertion of said protrusion into said slot, said tab being released when said enlarged element is moved away from said tab by movement of said hemispherical portion with respect to said concave portion without removal of said protrusion from said slot, and thereafter preventing disengagement of said protrusion from said slot by interference of the underside surface of said ledge and the inner surface of said tab when said enlarged element is moved back near said tab.

15. The interlocking assembly as claimed in claim 14, wherein said enlarged element is asymmetrical and proportioned so that said protrusion is locked within said slot when the hemispherical portion is rotated with respect to the concave portion.

16. The interlocking assembly as claimed in claim 15, further comprising a pair of diametrically disposed protruding stops and means for defining respective portions of a figure-eight shaped recess for receiving said stops for limiting the angular position of the hemispherical portion with respect to the concave portion to within a predefined angular range after the protrusion is inserted into said slot and the hemispherical portion is rotated with respect to the concave portion.

17. The interlocking assembly as claimed in claim 14, wherein said enlarged element is proportioned so that said tab is released when the enlarged element is moved away from said tab by sliding said hemispherical portion with respect to said concave portion.

18. The interlocking assembly as claimed in claim 17, further comprising a guide for receiving one of said protruding stops for guiding said sliding of said hemispherical portion with respect to said concave portion along said slot and preventing rotation of said hemispherical portion with respect to said concave portion until said tab is released.

19. The interlocking assembly as claimed in claim 14, wherein said resilient tab is generally planar and contoured spherically in conformity and alignment with the hemispherical portion.

20. The interlocking assembly as claimed in claim 14, wherein said enlarged element includes a rigid tab which defines the ledge.

21. The interlocking assembly as claimed in claim 14, wherein the hemispherical and concave portions are unitary pieces of thermoplastic resin 22. The interlocking assembly as claimed in claim 14, wherein said slot has opposite end portions and said resilient tab is disposed at an intermediate location with respect to said end portions.

23. The interlocking assembly as claimed in claim 22, wherein a second resilient tab is formed defining an edge portion of said slot, and the resilient tabs are diametrically opposite each other on opposite sides of said slot.

24. The interlocking assembly as claimed in claim 23, wherein said protrusion is formed with a pair of tabs diametrically opposite each other about said protrusion to align with and abut said resilient tabs during insertion of said protrusion into said slot.

25. The interlocking assembly as claimed in claim 24, wherein said resilient tabs are displaced from each other along said slot.

26. The interlocking assembly as claimed in claim 25, wherein said slot is defined in said hemispherical portion, and said protrusion is defined in said concave portion.

27. An interlocking assembly for adjustably mounting a display unit on a fixed structure; said assembly including a hemispherical portion being adapted for mounting to the underside of said display unit, and a concave portion mating with said hemispherical portion and being adapted for mounting on said fixed structure; one of said hemispherical portion and said concave portion having defined therein a slot; and the other of said portions having defined thereon a protrusion adapted for protruding through said slot; said protrusion having an enlarged element for preventing disengagement of said protrusion from the slot; said enlarged element being asymmetrical so that said protrusion is locked within said slot when the hemispherical portion is rotated with respect to the concave portion; and said interlocking assembly further comprising a pair of protruding stops and means for defining respective portions of a figure-eight shaped recess for receiving said stops for limiting the angular position of the hemispherical portion with respect to the concave portion to within a predefined angular range after the protrusion is inserted into said slot and the hemispherical portion is rotated with respect to the concave portion 28. The interlocking assembly as claimed in claim 27, wherein said slot is defined to receive said enlarged element at a predefined location along said slot and to engage said enlarged element when said enlarged element is received in said slot and moved away from said predefined location, and said interlocking assembly further comprising a guide for receiving one of said protruding stops for guiding said sliding of said hemispherical portion with respect to said concave portion along said slot and preventing rotation of said hemispherical portion with respect to said concave portion until said enlarged element is moved sufficiently away from said predefined location for said enlarged element to be engaged in said slot.

29. The interlocking assembly as claimed in claim 28, further comprising a resilient tab for preventing said enlarged element from being removed from said slot when said enlarged element is disposed at said predefined location.

30. A method of assembling an interlocking assembly for adjustably mounting a display unit with respect to a fixed structure; said assembly including a first portion and a second portion, one of said first and second portions being adapted for mounting to said display unit and the other of said first and second portions being adapted for mounting to said fixed structure; said first portion having defined therein a slot; said second portion having defined thereon a protrusion adapted for protruding through said slot, said protrusion having an enlarged element for preventing disengagement of said protrusion from the slot; said first portion having a resilient tab, said tab having inner and outer surfaces with respect to said second portion; and said tab being disposed adjacent said slot so that said enlarged element abuts against the outer surface of said tab to deflect said tab inward during assembly by insertion of said protrusion into said slot, the deflected tab being released when said enlarged element is moved away from said tab by movement of said first portion with respect to said second portion without removal of said protrusion from said slot, and preventing disengagement of said protrusion from said slot by interference of said enlarged element with the inner surface of said tab without interference with rotation and travel of said protrusion within said slot when said enlarged element is moved back near said tab; said enlarged element being asymmetrical so that said tab is released and said protrusion is locked within said slot when the enlarged element is moved away from said tab by rotating the first portion with respect to the second portion; said method comprising the steps of:

(1) aligning the enlarged element of said protrusion with the outer surface of said resilient tab;

(2) forcing said protrusion into said slot to deflect said resilient tab; and (3) rotating the first portion with respect to the second portion to lock said protrusion within said slot.

31. The method of assembling as claimed in claim 30, wherein the interlocking assembly further comprising means for guiding said sliding of said first portion with respect to said second portion along said slot and preventing rotation of said first portion with respect to said second portion until said tab is released, and said method further comprises a step (2a) of sliding said first portion with respect to said second portion along said slot until said tab is released, and wherein said step (2a) of sliding is performed after said step (2) of forcing and before said step (3) of rotating.

* * * * *